United States Patent [19]

Moriwaki et al.

[11] Patent Number: 5,131,920
[45] Date of Patent: Jul. 21, 1992

[54] METHOD OF MANUFACTURING SEALED RECHARGEABLE BATTERIES

[75] Inventors: Yoshio Moriwaki; Hajime Seri; Akemi Shintani; Tsutomu Iwaki; Yoshinori Toyoguchi, all of Osaka, Japan

[73] Assignee: Matsushita Electric Industrial Co., Ltd., Osaka, Japan

[21] Appl. No.: 713,286

[22] Filed: Jun. 11, 1991

[30] Foreign Application Priority Data

Jun. 11, 1990 [JP] Japan .................................. 2-152032

[51] Int. Cl.⁵ .......................................... H01M 10/00
[52] U.S. Cl. ................................... 29/623.2; 429/60
[58] Field of Search ................ 29/623.2; 429/101, 60; 204/2.1; 420/920

[56] References Cited

U.S. PATENT DOCUMENTS 4,716,088 12/1987 Reichman ........................ 429/101

Primary Examiner—Anthony Skapars
Attorney, Agent, or Firm—Wenderoth, Lind & Ponack

[57] ABSTRACT

The invention relates to a new method of manufacturing a sealed rechargeable alkaline battery including metal oxides as positive electrode active materials and a hydrogen absorbing alloy as a negative electrode material. The basic principle of the method is that, instead of the conventional electrochemical formation, the property of a hydrogen absorbing alloy is utilized to cause the negative electrode to absorb hydrogen to thereby achieve precharged portions within the negative electrode having a relatively larger capacity as compared with the positive electrode. Regardless of the kind of positive electrode, the method of the invention insures a broad freedom in the capacity appropriation between the positive and negative electrodes.

16 Claims, 1 Drawing Sheet

METHOD OF MANUFACTURING SEALED RECHARGEABLE BATTERIES

FIELD OF THE INVENTION

This invention relates to a method of manufacturing sealed rechargeable batteries.

BACKGROUND OF THE INVENTION

Alkaline batteries, in which an alkaline electrolyte is used, and lead-acid batteries are widely used as rechargeable batteries to serve as various power sources. Generally, alkaline batteries have a long service life and are highly reliable, compact and lightweight. For those and other reasons, small-size cells and batteries are now rapidly extending their range of application in various portable devices and apparatuses, whereas large-capacity, large-size batteries have a long history as industrial power sources.

A number of battery systems are available for alkaline batteries. While some systems use an air electrode or a silver oxide electrode as the positive electrode, most of the alkaline battery systems recently available use, as the positive electrode, a nickel electrode comprising nickel oxides as active materials. The original nickel-based positive electrode was a long-life pocket type plate. Later advent of the technology of sintered plates, which show high rate charge and discharge characteristics, and of foamed metal type plates, which have a higher capacity density, has contributed to a greatly expanded range of use of nickel positive electrodes.

On the other hand, active materials for negative electrodes include not only cadmium but also zinc, iron annd hydrogen, among others. So far, cadmium electrodes have been used in the main since they have a long service life and facilitate sealing of batteries. In particular, the demand for sealed nickel-cadmium rechargeable batteries is rapidly growing with the recent improvements in fast charge characteristics and in capacities. However, the conventional battery systems have their limit in meeting the demand for batteries having a higher energy density for size and weight reduction of devices and apparatuses. Under these circumstances, sealed rechargeable batteries of a nickel-metal hydride system (commonly, nickel-hydrogen system) in which a hydrogen-absorbing alloy higher in capacity density than cadmium and capable oof repeated absorption and desorption of hydrogen upon charging and discharging, respectively, is used as the negative electrode, are reaching the stage of practical use.

Sealed rechargeable batteries employing a nicekl-hydrogen system have a nominal cell voltage of 1.2 V, which is the same as that of nickel-cadmium system batteries. With the same cell size and construction, their discharge capacity can be at least 140% of that of nickel-cadmium system batteries. Thus, the nickel-hydrogen system is advantageous in that it is higher in energy density, and further in that it is compatible with the nickel-cadmium system or, in other words, can be handled in the same manner.

For the manufacture of sealed rechargeable batteries which employ a nickel-hydrogen system, it is basically necessary to establish a positive and negative electrode capacity relationship in the same manner as in the nickel-cadmium system. Thus, preliminary adjustment has to be made to meet the following prerequisites: (1) the negative electrode capacity should be larger than the positive electrode capacity and (2) after charging in the sealed cell state until full charging of the positive electrode, there should exist, in the negative electrode, portions in the uncharged state, which are further chargeable, and portions in the already charged state. When the sealed rechargeable batteries thus adjusted are charged to the extent of overcharge, oxygen is generated from the positive electrode. This oxygen reacts with, and is absorbed into, the charged-state portions of the negative electrode to give portions in the uncharged state. Accordingly, further continued charging will not result in full charging of the negative electrode. Thus, in principle, hydrogen will not be generated from the negative electrode forever. The oxygen cycle reaction mentioned above establishes and maintains an equilibrium pressure within the cell. To cause portions in the prelimiinary charged state to exist in the negative electrode is to make the dischargeable capacity of the negative electrode greater than that of the positive electrode. In this arrangement, the discharge capacity of the cell is limited by the positive electrode even in deep high-rate discharge and the unrepairable damage due to overdischarge and passivation of the negative electrode is precluded. Moreover, the existence of such a pre-charged portion of the negative electrode means that the negative discharge still has a substantial reduced portion even when the positive electrode has been fully charged to generate oxygen and, therefore, the oxygen absorbing capacity of the negative electrode is increased. Therefore, byy increasing the precharged portions of the negative electrode, an improvement can be obtained in the fast charge characeristics which is one of the important qualities of a sealed battery. As aforesaid, provision of precharged portions in the excess capacity of the negative electrode over the positive electrode is not only conducive to improved discharge rate characteristics and suppression of capacity decrease of the negative electrode, but also contributes to improved fast charge characteristics. The uncharged portion of the capacity of the negative electrode as the balance after such pre-charging in the excess capacity over the positive electrode insures no evolution of hydrogen from the negative electrode even in an overcharged state, contributing to inhibition of pressure buildup within the cell.

Establishment of such a capacity appropriation between the positive and negative electrodes is the basic requisite for implementing an improved sealed battery. Other important parameters are electrode plate group configuration or geometry, selection of the proper separator, proper electrolyte composition and volume, and so on.

In achieving said proper appropriation of capacity between the positive and negative electrodes, it is an important procedure to pre-charge the negative electrode to a given extent to partially reduce the same. In the conventional nickel-cadmium system, whereas the positive electrode is eitehr an unformed/unformed electrode or an electrode subjected to thorough formation, viz. full charging and full discharging, the negative electrode is prepared by a formation process in which an unformed electrode plate or an electrode plate previously charged and discharged is partially charged to a required extent. The positive and negative electrodes thus formed are rinsed, dried and assembled with a separator into an electrode plate group to provide a sealed battery.

Referring to the nickel-hydrogen system, U.S. Pat. No. 4,716,088 describes an example in whichh, although the object is to activate the hydrogen absorbing alloy of the negative electrode, the negative electrode is caused to absorb hydrogen by charging to electrochemically reduce it to the hydride (hydriding) just as in the case of the cadmium electrode. Since an electrode plate group is fabricated using such a partially charged and formed hydrogen absorbing alloy as the negative electrode, withdrawal from the alkaline electrolyte, rinsing and drying causes oxidation of the negative electrode on contact with the atmospheric air and at times a violent oxidation reaction occurs to cause a problem of ignition. If short of ignition, hydrogen is readily desorbed from the negative electrode under atmospheric pressure and even if the storage atmosphere is replaced with hydrogen taking the equlibrium pressure into consideration, it is extremely difficult to control the precharged portion of the negative electrode exactly as designed.

Therefore, an alternative approach has been taken to insure an excess capacity of the negative hydrogen absorbing alloy electrode over the positive electrode when the positive electrode has been fully charged. Thus, in a non-sintered plate such as aone of the foamed metal type, cobalt is added to the active material, nickel hydroxide, for improved utilization rate, not using the conventional cobalt hydroxide alone but using finely divided powders of cobalt metal powder, like carbonyl cobalt. Using such a positive electrode, a negative hydrogen absorbing alloy electrode having a larger capacity than the positive electrode and a separator, an electrode plate group is assembled and after the electrode plate group is inserted in a cell housing, a predetermined quantity of the electrolyte is added. After sealing, the assembled battery is charged. By this charging, the metal cobalt in said positive electrode is oxidized together with the active nickel hydroxide and contributes to an improved utilization rate of the positive active material alongside the cobalt hydroxide separately added, but as is well known the cobalt oxide as such does not substantially function as a positive active material.

Thus, by the amount in which the metal cobalt added to the positive electrode is oxidized by charging, the proportion of the charged state of the negative electrode is increased. First, the charged portion of the negative electrode can be increased by increasing the level of addition of metal cobalt to the positive electrode, but there is a limit to this practice in view of insuring a high capacity of the cell. Moreover, the use of metal cobalt for cobalt supplementation is costly. In addition, since cobalt in metallic form cannot be filled into the nickel plaque in the active material impregnation process, the practice cannot be applied to sintered positive electrodes.

In accordance with the prsent invention, the property of the hydrogen absorbing alloy is utilized to control the relative capacity of the positive and negative electrodes over a wide range regardless of the kind of positive electrode, without being limited to nickel based positive electrodes.

SUMMARY OF THE INVENTION

The present invention relates to a method of manufacturing a sealed rechargeable batterry generally consisting of a positive electrode based on metal oxide active materials and a negative electrode based on a hydrogen absorbing alloy. More particularly, the invention relates to a method of manufacturing a sealed rechargeable battery which comprises inserting an electrode plate group, consisting of an uncharged positive electrode, an uncharged negative electrode having a larger capacity than the positive electrode and a separator interposed therebetween, in a cell housing, setting the resulting assembly in a sealable pressure-resistant vessel, introducing hydrogen into said pressure-resistant vessel to cause a part of the portion of the negative electrode in excess of the capacity of the positive electrode to absorb hydrogen in an amount necessary to form precharged portions therein, adding an alkaline electrolyte into said electrode plate group, and sealing off the housing.

Charging and discharging of such an alkaline battery employing a hydrogen-absorbing alloy as the negative electrode are equivalent to electrochemical reduction and oxidation and, stated differently, the absorption an desorption of hydrogen by said negative electrode. Stated in still another way, causing the hydrogen-absorbing alloy to absorb and desorb hydrogen is nothing but charging and discharging the negative electrode made of said alloy. As a derived effect of the present invention, the same degree of formation as obtainable by the chemical formation comprising charging and discharging the negative electrode can be achieved by causing the negative electrode to absorb and desorb hydrogen at least once, prior to absorption of a predetermined amount of hydrogen into the hydrogen-absorbing alloy used as the negative electrode, in the assembled condition of the electrode plate group. While many kinds of hydrogen absorbing alloys are known for use as the negative electrodes of alkaline batteries, the present invention is particularly useful when a hydrogen absorbing zirconium-nickel based alloy containing an $AB_2$ type Laves phase is used for the negative electrode. Thus, since the method of the invention comprises causing a negative electrode hydrogen absorbing alloy to absorb hydrogen, and then wetting the electrodes with the electrolyte, and does not involve direct contact with air, the above-mentioned particular alloy, which is highly reactive to hydrogen, is expected to insure a high capacity density and is very ready, in the hydride form, to be oxidized and permits safe and accurate hydrogen absorption treatment.

DETAILED DESCRIPTION OF THE INVENTION

Figure 1:
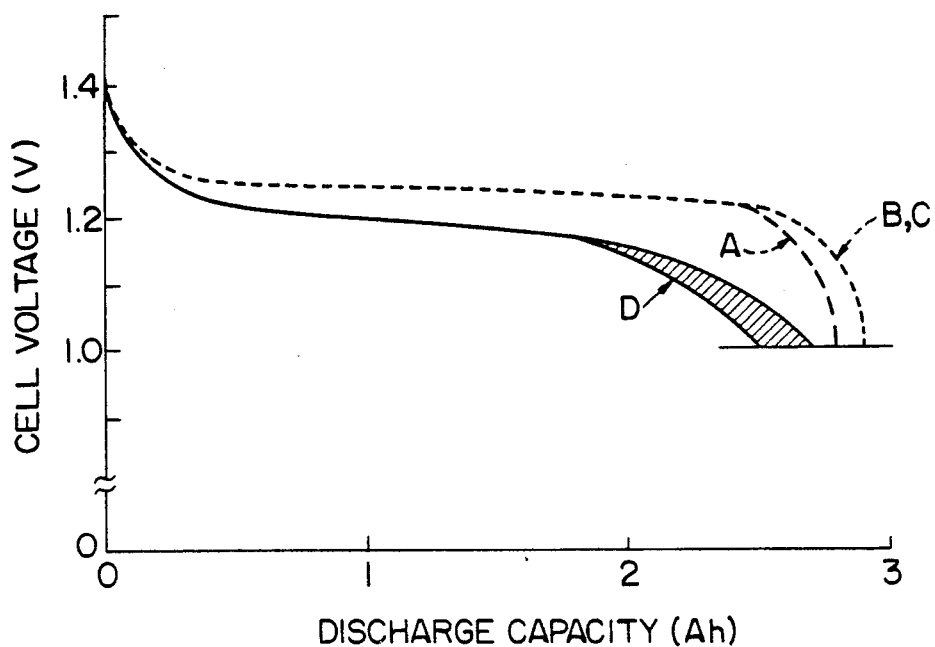
FIG. 1 is a discharge characteristic curve showing the results of an early cycle constant current discharge test at 1/2.5 C rate with the cells A, B and C of the present invention and the control cell D which was not subjected to hydrogen absorption treatment.

The present invention relates to a method of manufacturing a sealed alkaline battery generally consisting of a positive electrode based on metal oxides, typically of a nickel-hydrogen system, and a negative electrode based on a hydrogen absorbing alloy. The invenion is predicted on the fact that the hydrogen absorbing alloy negative electrode in the hydride form is very highly oxidizable. Thus, the method comprises setting an electrode plate group consisting of an uncharged positive electrode, a negative electrode having a larger capacity than the positive electrode and a separator interposed therebetween in a cell housing in a hydrogen atmosphere to cause the excess of the capacity of the negative electrode over the capacity of the positive electrode to absorb hydrogen in an amount necessary to form precharged portions, then adding an alkaline electrolyte into the electrode plate group, and sealing off the cell housing. The method of the invention is now described in further detail by way of the following embodiment.

A finely divided hydrogen-absorbing alloy prepared by mechanical crushing of $ZrNi_{1.2}Mn_{0.4}Cr_{0.4}$, which is an alloy having an $AB_2$-type Laves phase, is kneaded with an aqueous solution of carboxymethylcellulose (CMC) to prepare a paste. A foamed nickel sheet with a porosity of 95% and a thickness of 1.2 mm is impregnated with the above paste, and after drying, is pressed to a theoretical capacity density of 1600 mAh/cc. The impregnated sheet is further dried under reduced pressure, impregnated with a 5% dispersion or solution of polytetrafluoroethylene (PTFE) and dried for increasing the inter-grain bond. The resulting foamed hydrogen absorbing alloy negative electrode is cut to a width of 33 mm and a length of 210 mm and a nickel plated steel strip for a lead is spot-welded to the center of the cut negative electrode. As a counter electrode to this negative electrode, a known foamed nickel positive plate is provided. This nickel positive plate remains to be formed as yet and its composition is similar to that of the nickel-cadmium positive electrode of high capacity type prepared by adding cobalt hydroxide and, as a conductive agent, a carbonyl nickel powder, to the active material nickel hydroxide, and is free of cobalt powder such as carbonyl cobalt. Together with a separator which is a polypropylene nonwoven fabric subjected to chemical hydrophilic treatment such as sulfonation, said positive and negative electrodes are spirally wound in coil form to provide an electrode plate group. At the periphery of the electrode plate group is exposed said negative electrode and such electrode plate group is inserted in a cell housing of sub C size. Then, the negative electrode lead strip is secured to the center of the inner bottom wall of the cell housing and the positive electrode lead strip to a cover fitted with a polyamide gasket about its periphery, both by spot welding. In this embodiment, with the theoretical capacity of the positive electrode being assumed as 100%, the theoretical capacity of the negative electrode is set to at least 150%. The incomplete cell comprising such an electrode plate group is transferred into a sealable pressure-resistant vessel and after removal of air and introduction of hydrogen, the negative electrode of said electrode plate group absorbs hydrogen in an ammount equivalent to 40% of the theoretical capacity of the positive electrode. Immediately thereafter, an alkaline electrolyte is added and the housing is sealed off to provide a finished alkaline cell. This finished cell is designated as cell A.

The above alkaline electrolyte is prepared by dissolving 25 g of lithium hydroxide in 1 l of an aqueous solution of potassium hydroxide having a specific gravity of 1.25.

The same incomplete cell as mentioned above is set in said pressure-resistant vessel and after evacuation, hydrogen is introduced at 40° C. and 30 kg/cm$^2$ to cause the negative hydrogen absorbing alloy to thoroughly absorb hydrogen. Then, the hydrogen pressure within the pressure-resistant vessel is lowered to near atmospheric to cause desorption of the hydrogen and, thereafter, the same amount of hydrogen as used for cell A is caused to be absorbed to provide a finished cell, which is designated as cell B. The above procedure for hydrogen absorption and desorption is carried out 3 times, and then the same amount of hydrogen as used for cell A is caused to be absorbed to provide a finished cell, which is designated as cell C. For all the cells A, B and C, the hydrogen equilibrium pressure in the negative electrode alloy is invariably subtatmospheric. As a control, the same incomplete cell as above is not subjected to the hydrogen absorption procedure but electrolyte is directly added and the cell is sealed to provide cell D.

Ten cells each of the above cells A, B, C and D are charged with a constant current of 0.52 A at 1/5 C based on the nominal capacity of 2.6 Ah at 20° C. for 6.5 h, which corresponds to 130% of the nominal capacity, and then discharged with a constant current of 1.0 A at 1/2.5 C to 1.0 V. The results of discharge in the 5th cycle are shown in FIG. 1. It is clear that the cells A, B and C of the invention showed little difference with a mean discharge voltage of 1.24 V and their discharge capacities were in the range of 2.8 to 2.9 Ah. Detailed observation of the results indicate that, in the initial cycles, the capacities are concentrated in a lower region in the case of cell A and in a higher region for cells B and C, with little difference between B and C. In contrast, cell D which was not subjected to hydriding of the negative electrode showed a low mean discharge voltage of 1.20 V and the initial cycle discharge capacity was also scattered over the range of 2.5 to 2.7 Ah near the nominal capacity of 2.6 Ah. The above results indicate the effectiveness of the invention wherein the hydrogen absorbing alloy negative electrode having a larger capacity than the positive electrode is first caused to absorb hydrogen to form portions therein which are equivalent to the precharged state. It is also clearly effective to perform at least one absorption and desorption cycle prior to the hydrogen absorption treatment for stabilizing the activity of the negative electrode and, hence, the charge-discharge characteristics of a finished cell and insuring a higher cell capacity.

Figure 2:
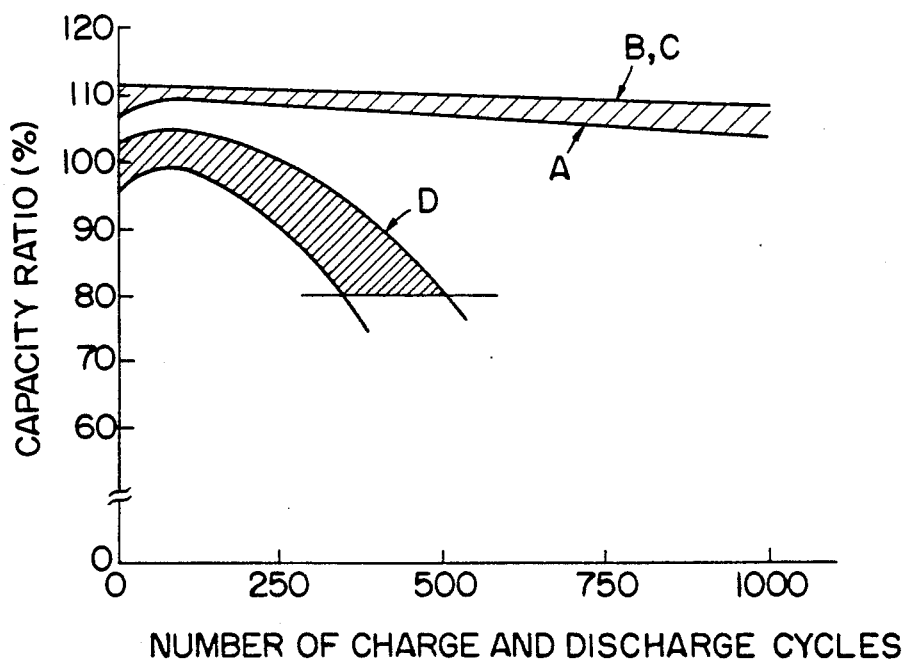
FIG. 2 is a diagrammatic representation of the capacity ratios (discharge capacity retention rates) of the above cells as plotted against the number of charge-discharge cycles, using the nominal capacity as the baseline.

Ten cells each oof the cells A, B, C and D subjected to the initial cycle capacity test were subjected to a charge-discharge cycle test which comprised repeatedly charging the cells under the above conditions and discharging with a constant resistance of 1.10Ω for 2.5 h at 20° C. The discharge capacity was measured at every 50 cycles in the same manner as the above preceding test. The charge-discharge cycle test was conducted under conditions more severe than usual, that is to say almost full discharge is made in each cycle. Referring to FIG. 2, the capacity ratio (capacity retention rate) is shown with the nominal capacity of 2.6 Ah as 100%. It is apparent from FIG. 2 that the cells A, B and C of the invention are stable in discharge capacity even after repeated charge and discharge, with capacities over the nominal capacity being still maintained even afer 1000 cycles. Of the sealed cells of the invention, cell A showed some increase in the capacity of about 2.8 Ah as the charge-discharge cycle was repeated but did not reach the levels of cells B and C. The cells B and C of the invention had an initial cycle capacity of as high as about 2.9 Ah and showed no remarkable decreases in capacity, being not much different from each other. In contrast, cell D which was not subjected to hydrogen absorption treatment of the negative electrode gained in discharge capacity in the 50 to 100th cycles but did not reach the level of cells A, B and C of the invention, with all the cell specimes showing decreases in capacity down to 80% of the nominal capacity by the end of 500 cycles. The reason is considered to be as follows. The discharge capacity of the cell increases as the hydrogen absorbing alloy of the negative electrode is activated during initial cycles. However, in this cell whose negative electrode was not previously allowed to absorb hydrogen, the negative electrode had no precharged portion over the capacity of the positive electrode. Therefore, as deep discharge taking place in each cycle is repeated, the cell capacity is limited by the capacity of the negative electrode so that the hydrogen absorbing alloy of the negative electrode is oxidized and ultimately undergoes passivation. As a result, the negative electrode and, for that matter, the cell suffer decreases in capacity as the charge-discharge cycle is repeated many times.

The conditions of the hydrogen absorption and desorption, which is an essential feature of the present invention, are dependent on the kind of hydrogen absorbing alloy used for the negative electrode and the electrode plate configuration or geometry, but a broad range of freedom is available through control of hydrogen pressure and temperature. It should also be understood that while the hydrogen absorbing alloy of the negative electrode was caused to absorb hydrogen in an amount corresponding to 40 percent of the theoretical capacity of the positive electrode in the above embodiment, a similar effect can be achieved within the range of 5 to 50 percent according to the type of cell used.

Moreover, while the above embodiment was described with reference to a cylindrical cell employing a spirally wound electrode plate group, the invention is of course applicable to a rectangular cell housing an electrode plate group consisting of a positive electrode, usually as many plus one negative electrodes and a separator. Furthermore, while the manufacturing method described herein comprises causing the negative electrode of the electrode plate group to absorb a predetermined amount of hydrogen, immediately adding the electrolyte into the electrode plate group and sealing off the housing, a similar effect can be achieved by causing the negative electrode to absorb hydrogen after the electrode plate group has been previously saturated with the electrolyte. The latter method is advantageous in that since the hydrogen absorbing alloy is previously wetted by the electrolyte, the absorbed hydrogen is hard to be released if the assembly is taken out into the atmosphere, but has the disadvantage that it takees a long time period to consummate the absorption of hydrogen. The hydrogen absorption and desorption treatment of the negative electrode is basically identical with the hydriding which is carried out for measuring the PTC characteristics of hydrogen absorbing alloys with Sievert's apparatus. This is an expedient metthod such that the amount of hydrogen which has reacted with an alloy is calculated from the change in the internal pressure of a pressure-resistant vessel.

The treatment of the invention for causing the negative electrode to absorb hydrogen beforehand is effective for multi-component alloys based on $LaNi_5$, $MmNi_5$, etc., for example MmNiCoMnAl, which are generally known as hydrogen absorbing alloys. However, as explained in connection with the foregoing embodiment, an alloy based on nickel and zirconium and containing an $AB_2$ type Laves phase is active and ready to be oxidized, but since it easily absorbs the hydrogen which has diffused as dissolved in the electrolyte and reached the alloy, it is a suitable material for purposes of the invention. Furthermore, while the embodiment was described with a positive nickel electrode of foamed metal type being taken as an example, the invention can be embodied using a sintered positive electrode having good high-rate charge and discharge characteristics. Moreover, the method of the invention is applicable to the silver-hydrogen system using a porous silver plate as the positive electrode but, in this case, a semipermeable membrane material must be used for the separator.

Thus, the present invention provides an improved sealed rechargeable battery employing a metal oxide for the positive electrode and a hydrogen absorbing alloy for the negative electrode which, by virtue of ingeniously controlled capacity appreciation between the positive and negative electrodes through utilization of the property of the hydrogen absorbing alloy, insures a high-capacity, stable performance over a long time.

What is claimed is:

1. A method of manufactufing a sealed rechargeable battery employing metal oxides as active materials of a positive electrode and a hydrogen absorbing alloy as a negative electrode material, which comprises subjecting a cell housing accommodating an electrode plate group consisting essentially of an uncharged positive electrode, a negative electrode having a larger capacity than the positive electrode and a separator interposed therebetween to a hydrogen atmosphere to cause a part of the excess capacity of the negative electrode over the capacity of the positive electrode to absorb hydrogen, an alkaline electrolyte being added to said electrode plate group before or after the absorption of hydrogen by said negative electrode, and sealing off said cell housing.

2. A method of manufacturing a sealed rechargeable battery as claimed in claim 1 wherein said hydrogen absorbing alloy of said negative electrode is subjected to at least one cycle of hydrogen absorption and desorption prior to said procedure of causing the negative electrode to absorb hydrogen.

3. A method of manufacturing a sealed rechargeable battery as claimed in claim 1 wherein, after said procedure for hydrogen absorption of the negative electrode, the electrode plate group is saturated with an alkaline electrolyte and the cell housing is sealed off.

4. A method of manufacturing a sealed rechargeable battery as claimed in claim 1 wherein said procedure for causing the negative electrode to absorb hydrogen is performed after addition of an alkaline electrolyte into the electrode plate group.

5. A method of manufacturing a sealed rechargeable battery as claimed in claim 3 wherein the amount of hydrogen absorbed by the negative electrode is controlled within the range corresponding to 5 to 50 percent of the theoretical capacity of the positive electrode.

6. A method of manufacturing a sealed rechargeable battery as claimed in claim 3 wherein the hydrogen absorbing alloy of the negative electrode is an alloy based on zirconium and nickel and containing an $AB_2$-type Laves phase.

7. A method of manufacturing a sealed rechargeable battery as claimed in claim 3 wherein said metal oxides are oxides of nickel.

8. A method of manufacturing a sealed rechargeable battery as claimed in claim 2 wherein said procedure for absorption and desorption of hydrogen by the negative electrode and said procedure for final absorption of hydrogen are performed in a combination of a step of transferring the electrode plate group as previously inserted in the cell housing into a sealable pressure-resistant vessel and removing air from the vessel, a subsequent step of introducing hydrogen into the vessel, a step of withdrawing hydrogen from said vessel, and another step of introducing hydrogen into said vessel.

9. A method of manufacturing a sealed rechargeable battery as claimed in claim 2 wherein, after said procedures for hydrogen absorption of the negative electrode, the electrode plate group is saturated with an alkaline electrolyte and the cell housing is sealed off.

10. A method of manufacturing a sealed rechargeable battery as claimed in claim 2 wherein said procedure for causing the negative electrode to absorb hydrogen is performed after addition of an alkaline electrolyte into the electrode plate group.

11. A method of manufacturing a sealed rechargeable battery as claimed in claim 4 wherein the amount of hydrogen absorbed by the negative electrode is controlled within the range corresponding to 5 to 50 percent of the theoretical capacity of the positive electrode.

12. A method of manufacturing a sealed rechargeable battery as claimed in claim 4 wherein the hydrogen absorbing alloy of the negative electrode is an alloy based on zirconium and nickel and containing an $AB_2$-type Laves phase.

13. A method of manufacturing a sealed rechargeable battery as claimed in claim 5 wherein the hydrogen absorbing alloy of the negative electrode is an alloy based on zirconium and nickel and containing an $AB_2$-type Laves phase.

14. A method of manufacturing a sealed rechargeable battery as claimed in claim 4 wherein said metal oxides are oxides of nickel.

15. A method of manufacturing a sealed rechargeable battery as claimed in claim 5 wherein said metal oxides are oxides of nickel.

16. A method of manufacturing a sealed rechargeable battery as claimed in claim 6 wherein said metal oxides are oxides of nickel.

* * * * *